(12) United States Patent
Liu et al.

(10) Patent No.: US 12,432,776 B2
(45) Date of Patent: Sep. 30, 2025

(54) SIDELINK SYNCHRONIZATION SIGNAL BLOCK PATTERNS FOR MULTIPLE LISTEN-BEFORE-TALK OPPORTUNITIES

(71) Applicant: QUALCOMM Incorporated, San Diego, CA (US)

(72) Inventors: Chih-Hao Liu, San Diego, CA (US); Jing Sun, San Diego, CA (US); Xiaoxia Zhang, San Diego, CA (US); Giovanni Chisci, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 417 days.

(21) Appl. No.: 18/057,383

(22) Filed: Nov. 21, 2022

(65) Prior Publication Data
US 2024/0057155 A1  Feb. 15, 2024

Related U.S. Application Data

(60) Provisional application No. 63/371,213, filed on Aug. 11, 2022.

(51) Int. Cl.
*H04W 74/0808* (2024.01)
*H04W 48/08* (2009.01)
*H04W 72/0446* (2023.01)

(52) U.S. Cl.
CPC ....... *H04W 74/0808* (2013.01); *H04W 48/08* (2013.01); *H04W 72/0446* (2013.01)

(58) Field of Classification Search
CPC ............. H04W 74/0808; H04W 48/08; H04W 72/0446; H04W 56/002; H04W 56/0015; H04L 5/0007; H04L 5/0053; H04L 5/00
See application file for complete search history.

(56) References Cited

U.S. PATENT DOCUMENTS

2017/0181011 A1* 6/2017 Yu ............................. H04L 5/00
2023/0124916 A1* 4/2023 Lindholm ............ H04W 56/002
                                                                370/329

FOREIGN PATENT DOCUMENTS

WO   WO-2020088637 A1 *  5/2020   ........... H04L 5/0007
WO   WO-2024000335 A1 *  1/2024   ........ H04W 56/0015

* cited by examiner

*Primary Examiner* — Vinncelas Louis
(74) *Attorney, Agent, or Firm* — Hayes and Boone LLP

(57) ABSTRACT

Wireless communications systems, apparatuses, and methods are provided. A method of wireless communication performed by a first sidelink user equipment (UE) includes performing a listen-before-talk (LBT) procedure and transmitting, to a second sidelink UE based on the LBT procedure being successful, a sidelink synchronization signal block (S-SSB) in one of a plurality of candidate S-SSB locations of a slot.

22 Claims, 9 Drawing Sheets

SIDELINK SYNCHRONIZATION SIGNAL BLOCK PATTERNS FOR MULTIPLE LISTEN-BEFORE-TALK OPPORTUNITIES

CROSS REFERENCE TO RELATED APPLICATIONS

The present application claims priority to and the benefit of U.S. Provisional Application No. 63/371,213, filed Aug. 11, 2022, which is hereby incorporated by reference in its entirety as if fully set forth below and for all applicable purposes.

TECHNICAL FIELD

This application relates to wireless communication systems, and more particularly, to sidelink synchronization signal block patterns for multiple listen-before-talk opportunities.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR is designed to provide a lower latency, a higher bandwidth or throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

NR may support various deployment scenarios to benefit from the various spectrums in different frequency ranges, licensed and/or unlicensed, and/or coexistence of the LTE and NR technologies. For example, NR can be deployed in a standalone NR mode over a licensed and/or an unlicensed band or in a dual connectivity mode with various combinations of NR and LTE over licensed and/or unlicensed bands.

In a wireless communication network, a BS may communicate with a UE in an uplink direction and a downlink direction. Sidelink was introduced in LTE to allow a UE to send data to another UE (e.g., from one vehicle to another vehicle) without tunneling through the BS and/or an associated core network. The LTE sidelink technology has been extended to provision for device-to-device (D2D) communications, vehicle-to-everything (V2X) communications, and/or cellular vehicle-to-everything (C-V2X) communications. Similarly, NR may be extended to support sidelink communications, D2D communications, V2X communications, and/or C-V2X over licensed frequency bands and/or unlicensed frequency bands (e.g., shared frequency bands).

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In an aspect of the disclosure, a method of wireless communication performed by a first sidelink user equipment (UE) may include performing a listen-before-talk (LBT) procedure and transmitting, to a second sidelink UE based on the LBT procedure being successful, a sidelink synchronization signal block (S-SSB) in one of a plurality of candidate S-SSB locations of a slot.

In an additional aspect of the disclosure, a method of wireless communication performed by a first sidelink user equipment (UE) may include receiving, from a second sidelink UE, a sidelink synchronization signal block (S-SSB) in one of a plurality of candidate S-SSB locations of a slot.

In an additional aspect of the disclosure, a first sidelink user equipment (UE) may include a memory; a transceiver; and at least one processor coupled to the memory and the transceiver, wherein the first sidelink UE is configured to perform a listen-before-talk (LBT) procedure and transmit, to a second sidelink UE based on the LBT procedure being successful, a sidelink synchronization signal block (S-SSB) in one of a plurality of candidate S-SSB locations of a slot.

In an additional aspect of the disclosure, a first sidelink user equipment (UE) may include a memory; a transceiver; and at least one processor coupled to the memory and the transceiver, wherein the first sidelink UE is configured to receive, from a second sidelink UE, a sidelink synchronization signal block (S-SSB) in one of a plurality of candidate S-SSB locations of a slot.

Other aspects, features, and instances of the present invention will become apparent to those of ordinary skill in the art, upon reviewing the following description of specific, exemplary instances of the present invention in conjunction with the accompanying figures. While features of the present invention may be discussed relative to certain aspects and figures below, all instances of the present invention can include one or more of the advantageous features discussed herein. In other words, while one or more instances may be discussed as having certain advantageous features, one or more of such features may also be used in accordance with the various instances of the invention discussed herein. In similar fashion, while exemplary aspects may be discussed below as device, system, or method instances it should be understood that such exemplary instances can be implemented in various devices, systems, and methods.

DETAILED DESCRIPTION

Figure 1:
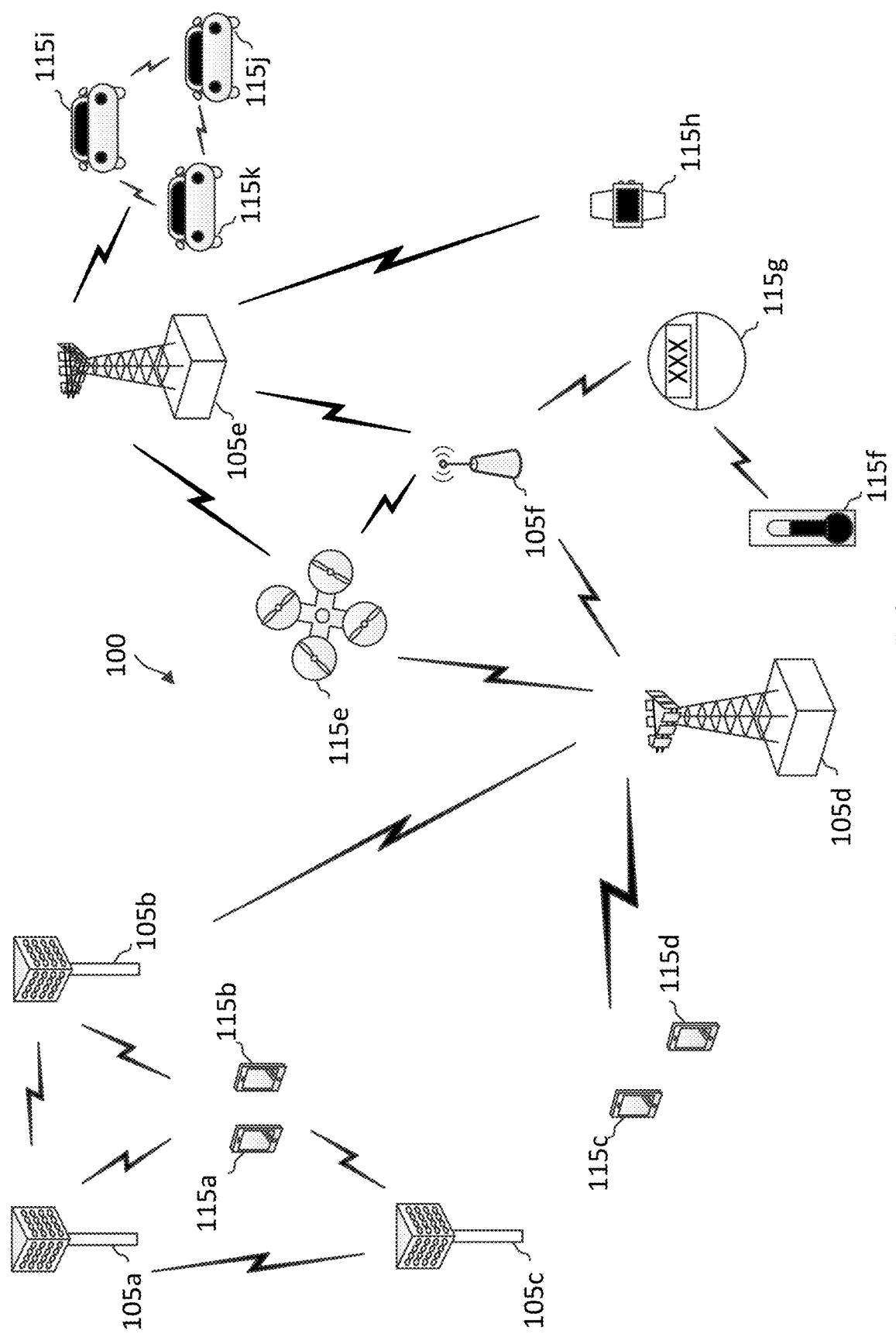
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various instances, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronic Engineers (IEEE) 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The deployment of NR over an unlicensed spectrum is referred to as NR-unlicensed (NR-U). Federal Communications Commission (FCC) and European Telecommunications Standards Institute (ETSI) are working on regulating 6 GHz as a new unlicensed band for wireless communications. The addition of 6 GHz bands allows for hundreds of megahertz (MHz) of bandwidth (BW) available for unlicensed band communications. Additionally, NR-U can also be deployed over 2.4 GHz unlicensed bands, which are currently shared by various radio access technologies (RATs), such as IEEE 802.11 wireless local area network (WLAN) or WiFi and/or license assisted access (LAA). Sidelink communications may benefit from utilizing the additional bandwidth available in an unlicensed spectrum. However, channel access in a certain unlicensed spectrum may be regulated by authorities. For instance, some unlicensed bands may impose restrictions on the power spectral density (PSD) and/or minimum occupied channel bandwidth (OCB) for transmissions in the unlicensed bands. For example, the unlicensed national information infrastructure (UNII) radio band has a minimum OCB requirement of about at least 70 percent (%).

Some sidelink systems may operate over a 20 MHz bandwidth, e.g., for listen before talk (LBT) based channel accessing, in an unlicensed band. ABS may configure a sidelink resource pool over one or multiple 20 MHz LBT sub-bands for sidelink communications. A sidelink resource pool is typically allocated with multiple frequency subchannels within a sidelink band width part (SL-BWP) and a sidelink UE may select a sidelink resource (e.g., one or multiple subchannels in frequency and one or multiple slots in time) from the sidelink resource pool for sidelink communication.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 illustrates a wireless communication network 100 according to some aspects of the present disclosure. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

ABS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of an evolved NodeB (eNB) or an access node controller (ANC)) may interface with the core network 130 through backhaul links (e.g., S1, S2, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a vehicle (e.g., a car, a truck, a bus, an autonomous vehicle, an aircraft, a boat, etc.). Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. In some aspects, the UE 115h may harvest energy from an ambient environment associated with the UE 115h. The network 100 may also provide additional network efficiency through dynamic, low-latency TDD/FDD communications, such as vehicle-to-vehicle (V2V), vehicle-to-everything (V2X), cellular-vehicle-to-everything (C-V2X) communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some instances, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some instances, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some instances, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In some instances, a UE 115 attempting to access the network 100 may perform an initial cell search by detecting a PSS from a BS 105. The PSS may enable synchronization of period timing and may indicate a physical layer identity value. The UE 115 may then receive an SSS. The SSS may enable radio frame synchronization, and may provide a cell identity value, which may be combined with the physical layer identity value to identify the cell. The SSS may also enable detection of a duplexing mode and a cyclic prefix length. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, SRS, and cell barring.

After obtaining the MIB, the RMSI and/or the OSI, the UE 115 can perform a random access procedure to establish a connection with the BS 105. For the random access procedure, the UE 115 may transmit a random access preamble and the BS 105 may respond with a random access response. Upon receiving the random access response, the UE 115 may transmit a connection request to the BS 105 and the BS 105 may respond with a connection response (e.g., contention resolution message).

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

The network 100 may be designed to enable a wide range of use cases. While in some examples a network 100 may utilize monolithic base stations, there are a number of other architectures which may be used to perform aspects of the present disclosure. For example, a BS 105 may be separated into a remote radio head (RRH) and baseband unit (BBU). BBUs may be centralized into a BBU pool and connected to RRHs through low-latency and high-bandwidth transport links, such as optical transport links. BBU pools may be cloud-based resources. In some aspects, baseband processing is performed on virtualized servers running in data centers rather than being co-located with a BS 105. In another example, based station functionality may be split between a remote unit (RU), distributed unit (DU), and a central unit (CU). An RU generally performs low physical layer functions while a DU performs higher layer functions, which may include higher physical layer functions. A CU performs the higher RAN functions, such as radio resource control (RRC).

For simplicity of discussion, the present disclosure refers to methods of the present disclosure being performed by base stations, or more generally network entities, while the functionality may be performed by a variety of architectures other than a monolithic base station. In addition to disaggregated base stations, aspects of the present disclosure may also be performed by a centralized unit (CU), a distributed unit (DU), a radio unit (RU), a Near-Real Time (Near-RT) RAN Intelligent Controller (RIC), a Non-Real Time (Non-RT) RIC, integrated access and backhaul (IAB) node, a relay node, a sidelink node, etc.

In some aspects, the UE 115i may perform a listen-before-talk (LBT) procedure. The UE 115i may transmit, to the UE 115j based on the LBT procedure being successful, a sidelink synchronization signal block (S-SSB) in one of a plurality of candidate S-SSB locations of a slot.

Figure 2:
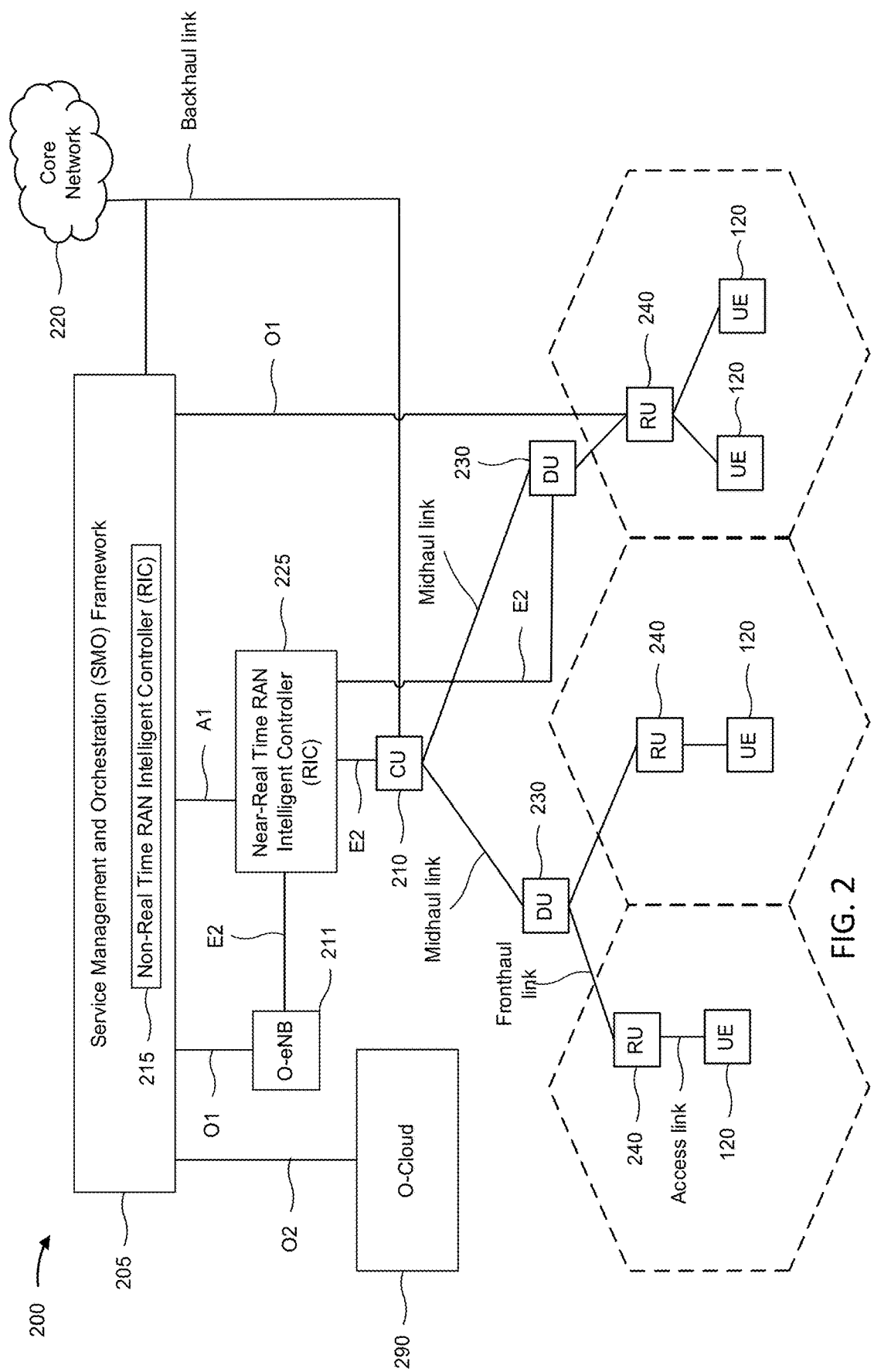
FIG. 2 illustrates an example disaggregated base station architecture according to some aspects of the present disclosure.

FIG. 2 shows a diagram illustrating an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 120 via one or more radio frequency (RF) access links. In some implementations, the UE 120 may be simultaneously served by multiple RUs 240.

Each of the units, i.e., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit-User Plane (CU-UP)), control plane functionality (i.e., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 120. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

In some aspects, a first UE 120 may perform a listen-before-talk (LBT) procedure. The first UE 120 may transmit, to a second UE 120 based on the LBT procedure being successful, a sidelink synchronization signal block (S-SSB) in one of a plurality of candidate S-SSB locations of a slot.

Figure 3:
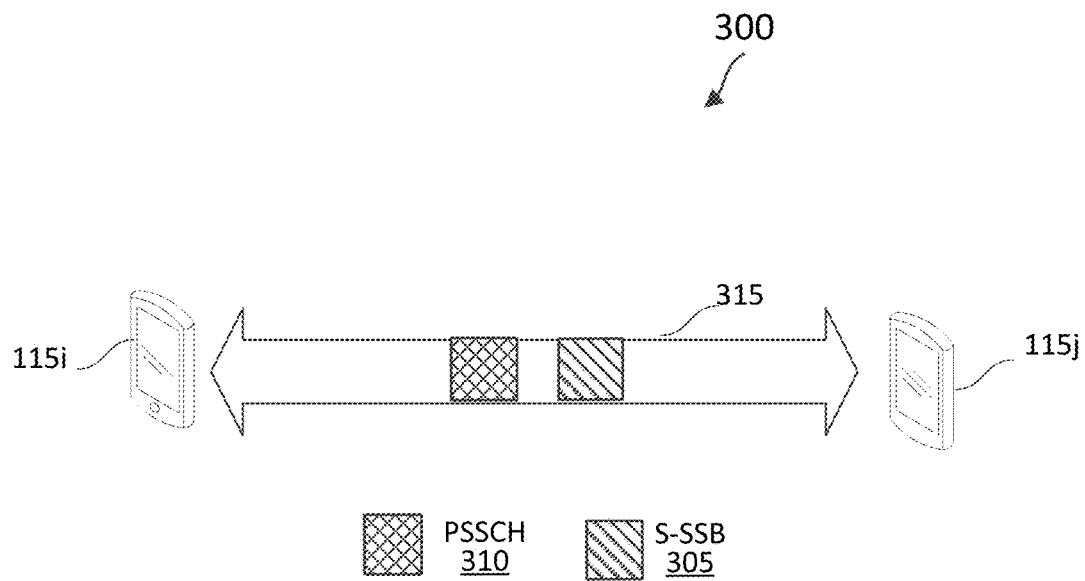
FIG. 3 illustrates a sidelink wireless communication network according to some aspects of the present disclosure.

FIG. 3 illustrates an example of a sidelink wireless communications network 300 that supports overlapping S-SSB patterns for shared spectrum in accordance with one or more aspects of the present disclosure. The sidelink wireless communications network 300 may implement aspects of the wireless communications network 100 and/or 200. For example, the sidelink wireless communications network 300 may include a UE 115*i* and a UE 115*j*, which may be examples of corresponding UEs 115 as described with reference to FIG. 1 and/or UEs 120 as described with reference to FIG. 2. The sidelink wireless communications network 300 may support the use of overlapping candidate S-SSB waveforms in a same subchannel (e.g., a 20 MHz subchannel) in a slot. The overlapping candidate S-SSB waveforms may enable multiple LBT opportunities for UE 115*i* and/or UE 115*j*.

Sidelink wireless communications network 300 may be an example of a 5G NR system, and may support wireless devices establishing an access link (e.g., a Uu interface)

and/or a sidelink (e.g., a PC5 interface). For example, a UE 115 may establish an access link with a network entity 105 and a sidelink (e.g., a sidelink communication link) with another UE 115. In some cases, a UE 115 may establish an access link with a network entity 105 and may establish a sidelink with another UE 115 which operates as a relay (e.g., which has an access link with the same or different network entity 105 as the UE 115) such that the UE 115 may communicate with a network via either the access link, or the sidelink, or both. In some cases, devices may use a sidelink to extend a coverage area. For example, a UE 115 may establish a sidelink with another UE 115 (e.g., a relay UE) having an access link with a network entity 105 for which the UE 115 is out of coverage. Sidelink communications may be referred to as vehicle-to-vehicle (V2V) communications, vehicle-to-everything (V2X) communications, D2D communications, or other terminology.

The wireless communication network 300 may include a communication link 315, which may be an example of a sidelink as described with reference to FIG. 1. The UE 115*i* may transmit information to the UE 115*j*, and the UE 115*j* may similarly transmit information to the UE 115*i*, over the sidelink. As an example, the UE 115*i* may transmit a PSSCH transmission 310 and/or one or more S-SSBs 305 to the UE 115*j*. In some cases, the UE 115*i* may transmit using time-frequency resources, which may not be synchronous with the operation of the UE 115*j*. For example, the UE 115*i* may transmit a PSSCH transmission 310 using a first slot, and the UE 115*j* may be unaware of the slot boundary to be used for receiving the PSSCH transmission 310. As such, the UE 115*i* may transmit (e.g., transmit periodically) one or more S-SSBs 305, which may facilitate synchronization of communications between multiple UEs 115. The UE 115*j* may receive the S-SSB 305 and perform one or more operations to synchronize time-frequency resources with the UE 115*i*. In some cases, the S-SSB 305 may include a PSS, an SSS, and/or a PBCH. The UE 115 may transmit the S-SSB 305 using multicast, groupcast, or broadcast signaling.

The sidelink wireless communications network 300 may support sidelink communications in shared radio frequency spectrum bands (e.g., unlicensed radio frequency spectrum bands), which may not be reserved, allocated, or licensed for specific use cases or specific RATs. For example, the UE 115*i* may transmit the PSSCH transmission 310 to the UE 115*j* using one or more unlicensed radio frequency bands. The UE 115*i* may perform one or more channel access procedures to gain access to the one or more unlicensed frequency bands. As an example, a UE 115*i* may communicate using time-frequency resources after gaining access to a channel using one or more channel access techniques (e.g., LBT) to reserve resources for transmitting a signal. Upon gaining access to the shared spectrum, the UE 115*i* may transmit signaling using a number of symbol periods (e.g., OFDM symbol periods) within a slot, which may be an example of a TTI.

The shared spectrum may be associated with one or more conditions for spectrum usage. In some cases, a condition for shared spectrum usage may be associated with an occupied channel bandwidth (OCB). An OCB may be defined as a bandwidth that contains a portion (e.g., 80%) of a total signal power. For example, a UE 115 may transmit a signal with a nominal bandwidth. However, the signal (e.g., the measured signal) may occupy a portion of the nominal bandwidth (e.g., due to variations in signal power). In some cases, the OCB may be smaller than the nominal bandwidth.

A condition for shared spectrum usage may include a threshold associated with an OCB. For example, a wireless communication standard may specify a threshold percentage of a total signal power for a respective channel, which may be referred to herein as a "threshold OCB" or an "OCB threshold." In some other cases, a wireless communication standard may specify a threshold percentage of a total signal power, a threshold bandwidth, or both. The sidelink wireless communications network 300 may support one or more OCB thresholds for shared spectrum communications to reduce a percentage of a signal's bandwidth that is outside of a bandwidth allocated for communications between UEs 115 (e.g., to reduce interference and enable fairness to other transmitting devices in the system). An OCB threshold may be expressed as a minimum percentage of a nominal channel bandwidth to be occupied. For example, a wireless communications standard may specify that an OCB is larger than 80% of a respective nominal channel bandwidth.

Figure 4:
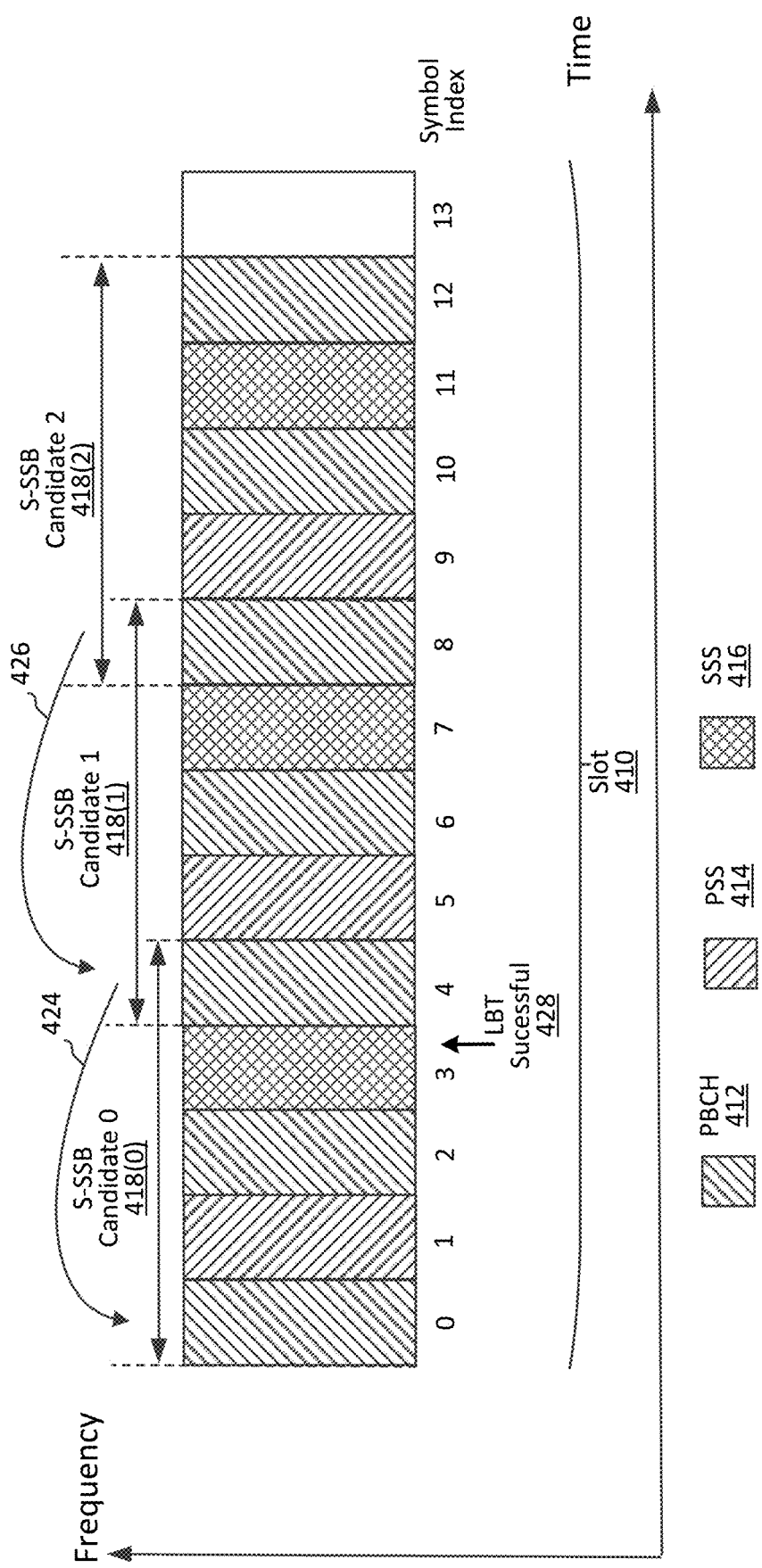
FIG. 4 illustrates an example of overlapping S-SSB resources according to some aspects of the present disclosure.

FIG. 4 illustrates an example of overlapping S-SSB resources according to some aspects of the present disclosure. In FIG. 4, the x-axis represents time in some arbitrary units and the Y axis represents frequency in some arbitrary units. In some aspects, a sidelink UE may transmit an S-SSB in one or more candidate S-SSB locations in a slot 410. In some aspects, one or more symbols of the candidate S-SSB locations may overlap in time and/or frequency.

In some aspects, a first sidelink UE (e.g., the UE 115, the UE 120, or the UE 600) may perform a listen-before-talk (LBT) procedure (e.g., LBT 428). The first sidelink UE may perform the LBT procedure 428 or other clear channel assessment (CCA) on one or more sidelink communication channels. In some instances, the first sidelink UE may perform an LBT procedure 428 or other CCA to gain access to a channel occupancy time (COT) in an unlicensed (e.g., shared) frequency spectrum. For example, the first sidelink UE may perform a category 1 LBT, a category 2 LBT, a category 3 LBT, and/or a category 4 LBT to gain access to the COT in an unlicensed frequency spectrum and transmit an S-SSB. In some aspects, the first sidelink UE may perform the LBT 428 in one or more time resources, spatial resources, and/or frequency resources. The frequency resources may include a frequency spectrum, a frequency band, a frequency sub-band, a frequency subchannel, resource elements, resource blocks, and/or a frequency interlace. The time resources may include slot(s) 410, sub-slot(s), symbol(s), subframe(s), or any other suitable time resources. In some aspects, the first sidelink UE may perform the LBT 428 for one or more directional beams (e.g., a beam in the direction of the UE that the first sidelink UE intends to transmit a communication to and/or receive a communication from).

In some aspects, the first sidelink UE may transmit a sidelink synchronization signal block (S-SSB) to a second sidelink UE (e.g., the UE 115, the UE 120, or the UE 600) based on the LBT procedure 428 being successful. The first sidelink UE may transmit the S-SSB to the second sidelink UE in one of a plurality of candidate S-SSB locations 418 of a slot 410. The S-SSB may allow the second sidelink UE and other sidelink UEs to discover the first sidelink UE and establish a sidelink connection with the first sidelink UE for subsequent sidelink communications. The S-SSB may include a primary synchronization signal (PSS), a secondary synchronization signal (SSS) and/or a physical broadcast channel (PBCH). The PSS may enable synchronization of slot 410 timing and may indicate a physical layer identifier associated with the first sidelink UE. The SSS may enable radio frame synchronization. The SSS may also enable detection of a duplexing mode and a cyclic prefix length. In some aspects, the first sidelink UE may transmit S-SSBs using multiple beams in a beam-sweeping manner. In some aspects, the S-SSBs may be transmitted on respective directional beams, where one or more SSBs may be included within a burst.

In some aspects, the first sidelink UE may transmit the S-SSB in one or more of multiple S-SSB candidate locations 418 of slot 410 (e.g., a 14 symbol OFDM slot). Slot 410 may include one, two, three, four, or more candidate S-SSB locations 418 in slot 410. Each of the candidate S-SSB locations 418 may include multiple contiguous symbols. For example, the first sidelink UE may transmit the S-SSB in three, four, five, or more contiguous symbols of slot 410. In some aspects, the S-SSB may include one symbol for automatic gain (AGC) control, one symbol for the PSS 414, one symbol for the SSS 416, and one or more symbols for the PBCH 412. In some aspects, the PBCH 412 may occupy (e.g., share) the same bandwidth part with the SSS 416.

In some aspects, the AGC symbol may be located in a leading symbol of the S-SSB. The leading symbol of the S-SSB may be the first symbol of the S-SSB to be transmitted. The AGC symbol may be received by the second sidelink UE and used to set an amplifier gain of a receiver (e.g., receiver of the transceiver 610) of the second sidelink UE. Setting the gain of the receiver of the second sidelink UE using the AGC symbol in the leading symbol of the S-SSB may enable the second sidelink UE to properly decode the PSS 414, SSS 416, and/or PBCH 412 received in subsequent symbols. In some aspects, the content of the AGC symbol may match the content of a PBCH 412 symbol of the S-SSB. In other words, the leading symbol of the S-SSB serving as an AGC symbol for the second sidelink UE may be the same as one of the PBCH 412 symbols of the S-SSB. The AGC symbol may match any one of the PBCH 412 symbols of the S-SSB. In some aspects, the AGC symbol may match the trailing (e.g., the last) PBCH 412 symbol of the S-SSB as indicated by arrows 424 and 426 in FIG. 3. In this case, the leading symbol of the S-SSB and the trailing symbol of the S-SSB may match.

In some aspects, the first sidelink UE may perform one or more rate matching operations associated with the S-SSB. For example, the first sidelink UE may rate match the PBCH 412 resources around the AGC symbol resources. In some aspects, the first sidelink UE may rate match the PBCH 412 resources around the AGC symbol resources in order to satisfy an occupied channel bandwidth (OCB) threshold (e.g., an 80% OCB threshold).

In some aspects, the S-SSB may include five contiguous symbols. The leading symbol (e.g., the first symbol) may include the AGC symbol (e.g., with the contents of the AGC symbol matching the trailing PBCH 412 symbol). The second symbol may include the PSS 414. The third symbol may include the PBCH 412. The fourth symbol may include the SSS 416 and the PBCH 412. The SSS 416 may occupy resource elements in the middle of the bandwidth part associated with the fourth symbol. The PBCH 412 may occupy the rest of the resource elements not occupied by the SSS 416 in the bandwidth part of the fourth symbol. The trailing symbol (e.g., the fifth symbol) may include the PBCH 412 matching the content of the leading symbol.

The slot 410 may include 14 symbols (e.g., symbol indexes 0 to 13 as shown in FIG. 3). The slot 410 may include three candidate S-SSB locations 418(0), 418(1), and 418(2) each occupying five contiguous symbols. Candidate S-SSB location 418(0) may include symbol indexes 0-4. Candidate S-SSB location 418(1) may include symbol indexes 4-8. Candidate S-SSB location 418(2) may include symbol indexes 8-12. Symbol index 13 may include a guard symbol. In some aspects, the trailing symbol of candidate S-SSB location 418(0) may overlap the leading symbol of the S-SSB candidate location 418(1). For example, trailing symbol index 4 of the candidate S-SSB location 418(0) may overlap the leading symbol index 4 of candidate S-SSB location 418(1). Trailing symbol index 4 of the candidate S-SSB location 418(0) and leading symbol index 4 of candidate S-SSB location 418(1) may include the same PBCH 412 content as indicated by arrow 424. Trailing symbol index 8 of the candidate S-SSB location 418(1) may overlap the leading symbol index 8 of the candidate S-SSB location 418(2). Trailing symbol index 8 of the candidate S-SSB location 418(1) and leading symbol index 8 of candidate S-SSB location 418(2) may include the same PBCH content as indicated by arrow 426. In some aspects, the second sidelink UE may receive an S-SSB from the first sidelink UE and another S-SSB from another sidelink UE (e.g., a syncref sidelink UE). For example, the second sidelink UE may receive an S-SSB from the first sidelink UE in the candidate S-SSB location 418(0) (e.g., symbols 0-4) and receive another S-SSB from another sidelink UE in the candidate S-SSB location 418(1) (e.g., symbols 4-8). Since the content of trailing symbol 4 of S-SSB candidate location 418(0) is the same as the content of leading symbol 4 of candidate S-SSB location 418(1), the second sidelink UE may set the gain of its receiver using the PBCH content of symbol 4.

In some aspects, the first sidelink UE may perform the LBT prior to transmitting the S-SSB in a candidate S-SSB location 418. Having multiple candidate S-SSB locations (e.g., 3 candidate S-SSB locations 418(0), 418(1), and 418(2)) in slot 410 may provide more opportunities for the first sidelink UE to perform a successful LBT and transmit the S-SSB as compared to having a single S-SSB candidate location 418 in the slot. For example, the first sidelink UE may perform an LBT prior to (e.g., just before) symbol index 0 to gain the channel. If the LBT is successful, the first sidelink UE may transmit the S-SSB in candidate S-SSB location 418(0) (e.g., symbol indexes 0-4). If the LBT prior to symbol index 0 fails, the first sidelink UE may have another opportunity to perform an LBT prior to symbol index 4. If the LBT prior to symbol index 4 is successful as indicated by LBT successful 428, the first sidelink UE may transmit the S-SSB in candidate S-SSB location 418(1) (e.g., symbol indexes 4-8). If the LBT prior to symbol index 4 fails, the first sidelink UE may have another opportunity to perform an LBT prior to symbol index 8. If the LBT prior to symbol index 8 is successful, the first sidelink UE may transmit the S-SSB in candidate S-SSB location 418(2) (e.g., symbol indexes 8-12).

Figure 5:
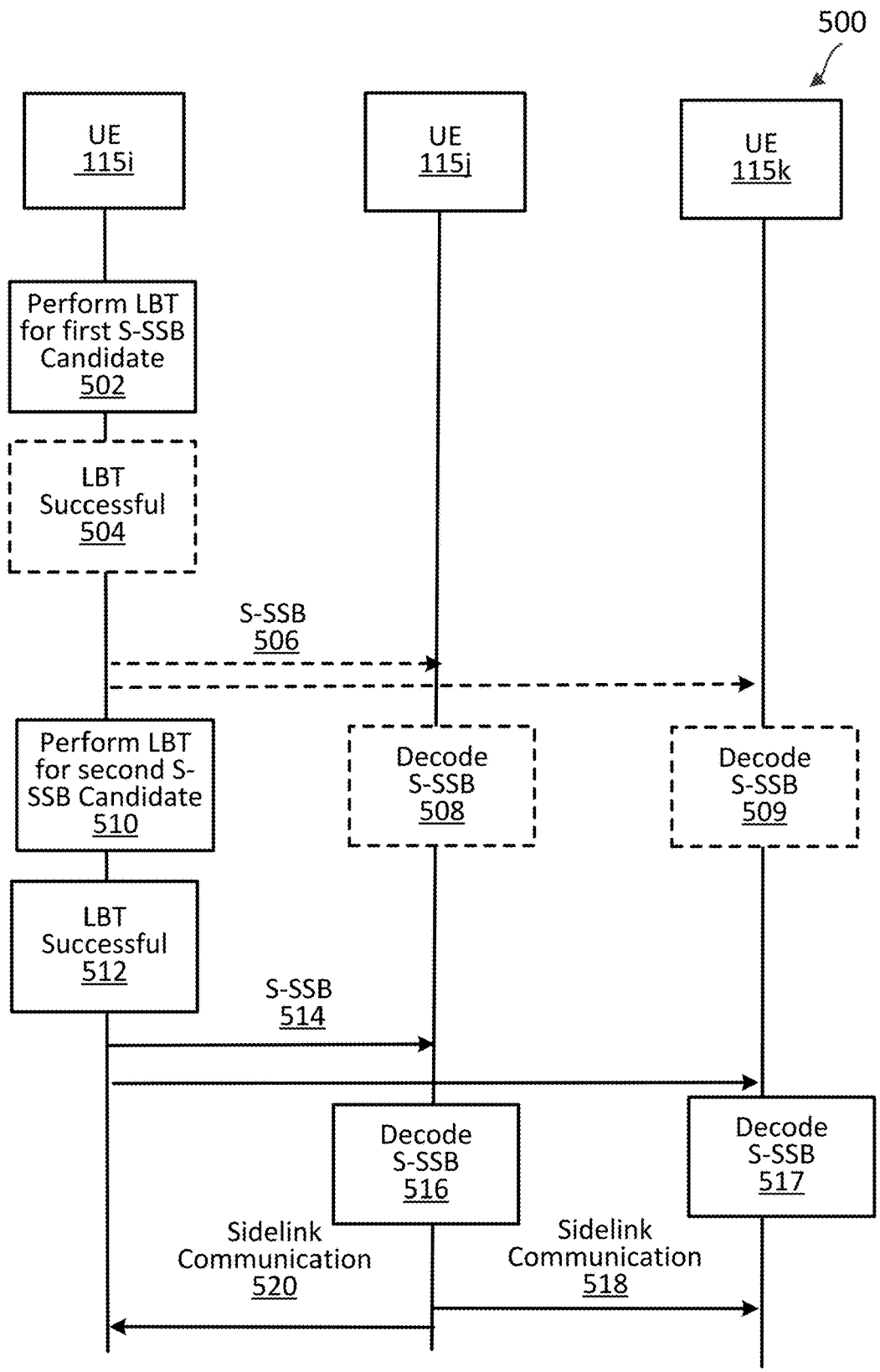
FIG. 5 is a signaling diagram of a wireless communication method according to some aspects of the present disclosure.

FIG. 5 is a signaling diagram of a wireless communication method 500 according to some aspects of the present disclosure. Actions of the communication method 500 can be executed by a computing device (e.g., a processor, processing circuit, and/or other suitable component) of a communication device or other suitable means for performing the actions. For example, a wireless communication device, such as the UE 115, UE 120, or UE 600, may utilize one or more components, such as the processor 602, the memory 604, the S-SSB module 608, the transceiver 610, the modem 612, and the one or more antennas 616, to execute aspects of method 500.

At action 502, the UE 115*i* may perform an LBT procedure prior to (e.g., just before) a first S-SSB candidate location. The UE 115*i* may perform the LBT procedure or other clear channel assessment (CCA) on one or more sidelink communication channels. In some instances, the UE 115$i$ may perform the LBT procedure or other CCA to gain access to a channel occupancy time (COT) in an unlicensed (e.g., shared) frequency spectrum. For example, the UE 115$i$ may perform a category 1 LBT, a category 2 LBT, a category 3 LBT, and/or a category 4 LBT to gain access to the COT in an unlicensed frequency spectrum.

At action 504, the UE 115$i$ may determine if the LBT procedure at action 502 was successful. If the LBT procedure was successful, the method 500 proceeds to action 506. If the LBT procedure at action 502 was unsuccessful, the method 500 proceeds to action 510.

At action 506, the UE 115$i$ may transmit the S-SSB to the UE 115$j$, the UE 115$k$, and other UEs in proximity to the UE 115$i$. The UE 115$i$ may transmit the S-SSB in the first candidate S-SSB location based on a successful LBT prior to the first candidate S-SSB location at action 502.

At action 508, the UE 115$j$ may decode the S-SSB received in the first candidate S-SSB location. The UE 115$j$ may synchronize a transceiver (e.g., transceiver 610) based on the decoded S-SSB.

At action 509, the UE 115$k$ may decode the S-SSB received in the first candidate S-SSB location. The UE 115$k$ may synchronize a transceiver (e.g., transceiver 610) based on the decoded S-SSB.

At action 510, the UE 115$i$ may perform an LBT procedure prior to (e.g., just before) a second S-SSB candidate location. The UE 115$i$ may perform the LBT procedure at action 510 based on the LBT procedure at action 502 being unsuccessful. In this manner, when a slot is configured with multiple candidate S-SSB locations, the UE 115$i$ may have multiple opportunities in a slot to perform a successful LBT and transmit an S-SSB.

At action 512, the UE 115$i$ may determine if the LBT procedure at action 510 was successful. If the LBT procedure was successful, the method 500 proceeds to action 514. If the LBT procedure at action 510 was unsuccessful, the method 500 may proceed to attempt another LBT before a third candidate S-SSB location.

At action 514, the UE 115$i$ may transmit an S-SSB to the UE 115$j$, the UE 115$k$, and other UEs in proximity to the UE 115$i$. The UE 115$i$ may transmit the S-SSB in the second candidate S-SSB location based on a successful LBT prior to the second candidate S-SSB location at action 510.

At action 516, the UE 115$j$ may decode the S-SSB received in the second candidate S-SSB location. The UE 115$j$ may synchronize a transceiver (e.g., transceiver 610) based on the decoded S-SSB.

At action 517, the UE 115$k$ may decode the S-SSB received in the second candidate S-SSB location. The UE 115$k$ may synchronize a transceiver (e.g., transceiver 610) based on the decoded S-SSB.

At action 518, the UE 115$j$ may transmit a sidelink communication (e.g., PSCCH, PSSCH) to the UE 115$k$. The UE 115$j$ may transmit the sidelink communication using a transceiver (e.g., transceiver 610) synchronized to the UE 115$i$ and UE 115$k$ based on the S-SSB received and decoded at action 516.

At action 520, the UE 115$j$ may transmit a sidelink communication (e.g., PSCCH, PSSCH) to the UE 115$i$. The UE 115$j$ may transmit the sidelink communication using a transceiver (e.g., transceiver 610) synchronized to the UE 115$i$ and UE 115$k$ based on the S-SSB received and decoded at action 516.

Figure 6:
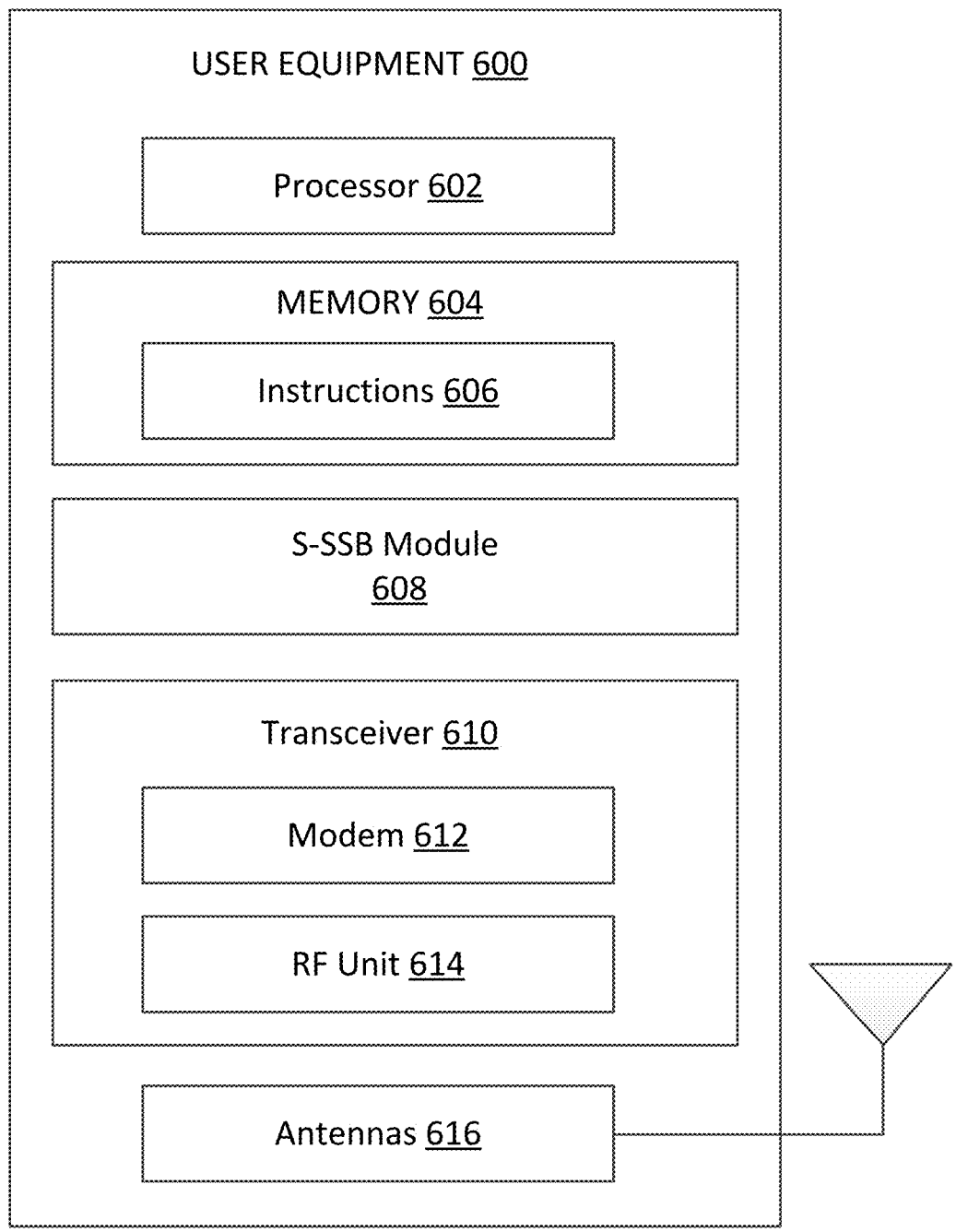
FIG. 6 is a block diagram of an exemplary user equipment (UE) according to some aspects of the present disclosure.

FIG. 6 is a block diagram of an exemplary UE 600 according to some aspects of the present disclosure. The UE 600 may be the UE 115 or the UE 120 in the network 100 or 200 as discussed above. As shown, the UE 600 may include a processor 602, a memory 604, a S-SSB module 608, a transceiver 610 including a modem subsystem 612 and a radio frequency (RF) unit 614, and one or more antennas 616. These elements may be coupled with each other and in direct or indirect communication with each other, for example via one or more buses.

The processor 602 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In some instances, the memory 604 includes a non-transitory computer-readable medium. The memory 604 may store instructions 606. The instructions 606 may include instructions that, when executed by the processor 602, cause the processor 602 to perform the operations described herein with reference to the UEs 115 in connection with aspects of the present disclosure, for example, aspects of FIGS. 3-5. Instructions 606 may also be referred to as code. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The S-SSB module 608 may be implemented via hardware, software, or combinations thereof. For example, the S-SSB module 608 may be implemented as a processor, circuit, and/or instructions 606 stored in the memory 604 and executed by the processor 602. In some aspects, In some aspects, the S-SSB module 1008 may implement the aspects of FIGS. 3-5. For example, the S-SSB module 608 may perform a listen-before-talk (LBT) procedure and transmit, to a second sidelink UE based on the LBT procedure being successful, a sidelink synchronization signal block (S-SSB) in one of a plurality of candidate S-SSB locations of a slot.

As shown, the transceiver 610 may include the modem subsystem 612 and the RF unit 614. The transceiver 610 can be configured to communicate bi-directionally with other devices, such as the BSs 105 and/or the UEs 115. The modem subsystem 612 may be configured to modulate and/or encode the data from the memory 604 and the according to a modulation and coding scheme (MCS), e.g., a low-density parity check (LDPC) coding scheme, a turbo coding scheme, a convolutional coding scheme, a digital beamforming scheme, etc. The RF unit 614 may be configured to process (e.g., perform analog to digital conversion or digital to analog conversion, etc.) modulated/encoded data from the modem subsystem 612 (on outbound transmissions) or of transmissions originating from another source such as a UE 115 or a BS 105. The RF unit 614 may be further configured to perform analog beamforming in conjunction with the digital beamforming. Although shown as integrated together in transceiver 610, the modem subsystem 612 and the RF unit 614 may be separate devices that are coupled together to enable the UE 600 to communicate with other devices.

The RF unit 614 may provide the modulated and/or processed data, e.g. data packets (or, more generally, data messages that may contain one or more data packets and other information), to the antennas 616 for transmission to one or more other devices. The antennas 616 may further receive data messages transmitted from other devices. The antennas 616 may provide the received data messages for processing and/or demodulation at the transceiver 610. The antennas 616 may include multiple antennas of similar or different designs in order to sustain multiple transmission links. The RF unit 614 may configure the antennas 616.

In some instances, the UE 600 can include multiple transceivers 610 implementing different RATs (e.g., NR and LTE). In some instances, the UE 600 can include a single transceiver 610 implementing multiple RATs (e.g., NR and LTE). In some instances, the transceiver 610 can include various components, where different combinations of components can implement RATs.

Figure 7:
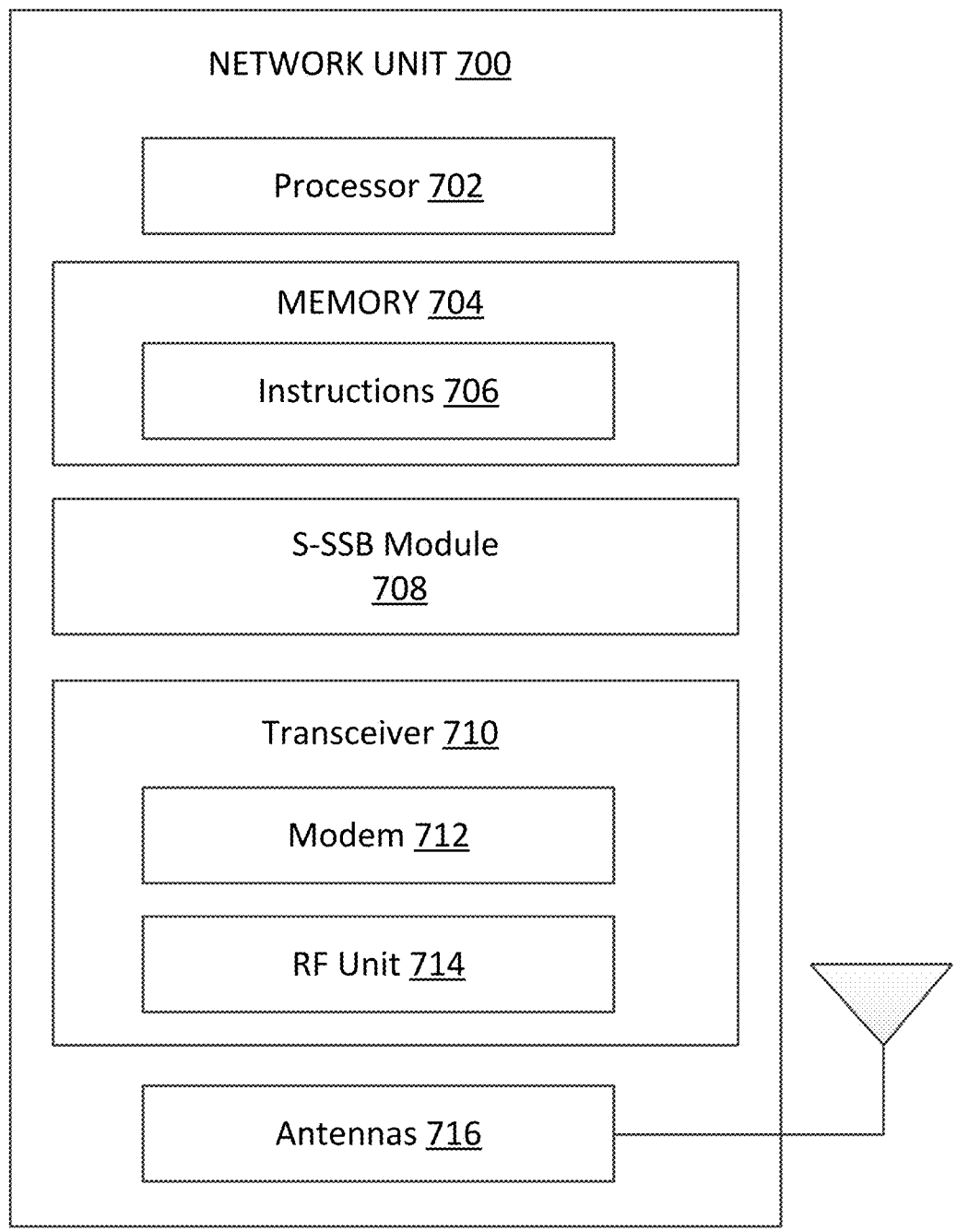
FIG. 7 is a block diagram of an exemplary network unit according to some aspects of the present disclosure.

FIG. 7 is a block diagram of an exemplary network unit 700 according to some aspects of the present disclosure. The network unit 700 may be a BS 105, the CU 210, the DU 230, or the RU 240, as discussed above. As shown, the network unit 700 may include a processor 702, a memory 704, a S-SSB module 708, a transceiver 710 including a modem subsystem 712 and a RF unit 714, and one or more antennas 716. These elements may be coupled with each other and in direct or indirect communication with each other, for example via one or more buses.

The processor 702 may have various features as a specific-type processor. For example, these may include a CPU, a DSP, an ASIC, a controller, a FPGA device, another hardware device, a firmware device, or any combination thereof configured to perform the operations described herein. The processor 702 may also be implemented as a combination of computing devices, e.g., a combination of a DSP and a microprocessor, a plurality of microprocessors, one or more microprocessors in conjunction with a DSP core, or any other such configuration.

The memory 704 may include a cache memory (e.g., a cache memory of the processor 702), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some instances, the memory 704 may include a non-transitory computer-readable medium. The memory 704 may store instructions 706. The instructions 706 may include instructions that, when executed by the processor 702, cause the processor 702 to perform operations described herein, for example, aspects of FIGS. 3-5. Instructions 706 may also be referred to as code, which may be interpreted broadly to include any type of computer-readable statement(s).

The S-SSB module 708 may be implemented via hardware, software, or combinations thereof. For example, the S-SSB module 708 may be implemented as a processor, circuit, and/or instructions 706 stored in the memory 704 and executed by the processor 702.

In some aspects, the S-SSB module 708 may implement the aspects of FIGS. 3-5. For example, the S-SSB module 708 may perform a listen-before-talk (LBT) procedure and transmit, to a sidelink UE based on the LBT procedure being successful, a sidelink synchronization signal block (S-SSB) in one of a plurality of candidate S-SSB locations of a slot.

Additionally or alternatively, the S-SSB module 708 can be implemented in any combination of hardware and software, and may, in some implementations, involve, for example, processor 702, memory 704, instructions 706, transceiver 710, and/or modem 712.

As shown, the transceiver 710 may include the modem subsystem 712 and the RF unit 714. The transceiver 710 can be configured to communicate bi-directionally with other devices, such as the UEs 115 and/or 600. The modem subsystem 712 may be configured to modulate and/or encode data according to a MCS, e.g., a LDPC coding scheme, a turbo coding scheme, a convolutional coding scheme, a digital beamforming scheme, etc. The RF unit 714 may be configured to process (e.g., perform analog to digital conversion or digital to analog conversion, etc.) modulated/encoded data from the modem subsystem 712 (on outbound transmissions) or of transmissions originating from another source such as a UE 115 or UE 600. The RF unit 714 may be further configured to perform analog beamforming in conjunction with the digital beamforming. Although shown as integrated together in transceiver 710, the modem subsystem 712 and/or the RF unit 714 may be separate devices that are coupled together at the network unit 700 to enable the network unit 700 to communicate with other devices.

The RF unit 714 may provide the modulated and/or processed data, e.g. data packets (or, more generally, data messages that may contain one or more data packets and other information), to the antennas 716 for transmission to one or more other devices. This may include, for example, a configuration indicating a plurality of sub-slots within a slot according to aspects of the present disclosure. The antennas 716 may further receive data messages transmitted from other devices and provide the received data messages for processing and/or demodulation at the transceiver 710. The antennas 716 may include multiple antennas of similar or different designs in order to sustain multiple transmission links.

In some instances, the network unit 700 can include multiple transceivers 710 implementing different RATs (e.g., NR and LTE). In some instances, the network unit 700 can include a single transceiver 710 implementing multiple RATs (e.g., NR and LTE). In some instances, the transceiver 710 can include various components, where different combinations of components can implement RATs.

Figure 8:
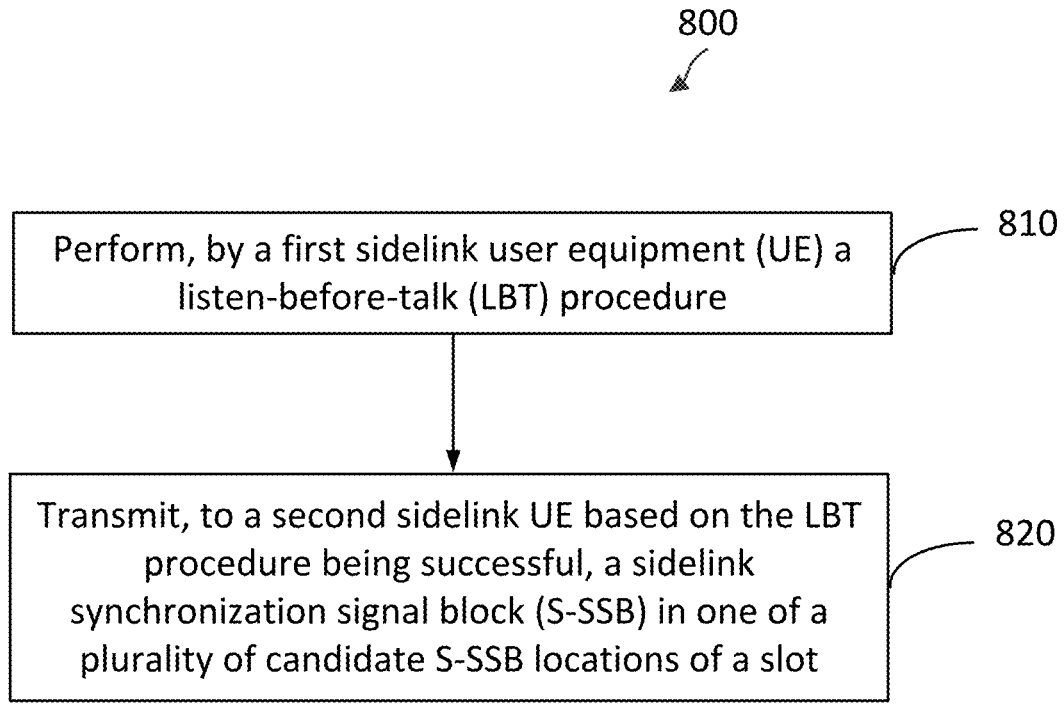
FIG. 8 is a flow diagram of a communication method according to some aspects of the present disclosure.

FIG. 8 is a flow diagram of a communication method 800 according to some aspects of the present disclosure. Aspects of the method 800 can be executed by a computing device (e.g., a processor, processing circuit, and/or other suitable component) of a wireless communication device or other suitable means for performing the aspects. For example, a wireless communication device, such as the UE 115, the UE 120, or the UE 600, may utilize one or more components, such as the processor 602, the memory 604, the S-SSB module 608, the transceiver 610, the modem 612, and the one or more antennas 616, to execute aspects of method 800. The method 800 may employ similar mechanisms as in the networks 100 and 200 and the aspects and actions described with respect to FIGS. 3-5. As illustrated, the method 800 includes a number of enumerated aspects, but the method 800 may include additional aspects before, after, and in between the enumerated aspects. In some aspects, one or more of the enumerated aspects may be omitted or performed in a different order.

At action 810, the method 800 includes a first sidelink UE (e.g., the UE 115, the UE 120, or the UE 600) performing a listen-before-talk (LBT) procedure. The first sidelink UE may perform the LBT procedure or other clear channel assessment (CCA) on one or more sidelink communication channels. In some instances, the first sidelink UE may perform an LBT procedure or other CCA to gain access to a channel occupancy time (COT) in an unlicensed (e.g., shared) frequency spectrum. For example, the first sidelink UE may perform a category 1 LBT, a category 2 LBT, a category 3 LBT, and/or a category 4 LBT to gain access to the COT in an unlicensed frequency spectrum. In some aspects, the first sidelink UE may perform the LBT in one or more time resources, spatial resources, and/or frequency resources. The frequency resources may include a frequency spectrum, a frequency band, a frequency sub-band, a frequency subchannel, resource elements, resource blocks, and/or a frequency interlace. The time resources may include slot(s), sub-slot(s), symbol(s), subframe(s), or any other suitable time resources. In some aspects, the first sidelink UE may perform the LBT for one or more directional beams (e.g., a beam in the direction of the UE that the first sidelink UE intends to transmit a communication to and/or receive a communication from).

At action 820, the method 800 includes the first sidelink UE transmitting a sidelink synchronization signal block (S-SSB) to a second sidelink UE (e.g., the UE 115, the UE 120, or the UE 600) based on the LBT procedure at action 810 being successful. The first sidelink UE may transmit the S-SSB to the second sidelink UE in one of a plurality of candidate S-SSB locations of a slot. The S-SSB may allow the second sidelink UE and other sidelink UEs to discover the first sidelink UE and establish a sidelink connection with the first sidelink UE for subsequent sidelink communications. The S-SSB may include a primary synchronization signal (PSS), a secondary synchronization signal (SSS) and/or a physical broadcast channel (PBCH). The PSS may enable synchronization of slot timing and may indicate a physical layer identifier associated with the first sidelink UE. The SSS may enable radio frame synchronization. The SSS may also enable detection of a duplexing mode and a cyclic prefix length. In some aspects, the first sidelink UE may transmit S-SSBs using multiple beams in a beam-sweeping manner. In some aspects, the S-SSBs may be transmitted on respective directional beams, where one or more SSBs may be included within a burst.

In some aspects, the first sidelink UE may transmit the S-SSB in one or more of multiple candidate locations of a slot (e.g., a 14 symbol OFDM slot). The slot may include one, two, three, four, or more candidate S-SSB locations in the slot. Each of the candidate S-SSB locations may include multiple contiguous symbols. For example, the first sidelink UE may transmit the S-SSB in three, four, five, or more contiguous symbols. In some aspects, the S-SSB may include one symbol for automatic gain (AGC) control, one symbol for the PSS, one symbol for the SSS, and one or more symbols for the PBCH. In some aspects, the PBCH may occupy (e.g., share) the same bandwidth part with the SSS.

In some aspects, the AGC symbol may be located in a leading symbol of the S-SSB. The leading symbol of the S-SSB may be the first symbol of the S-SSB to be transmitted. The AGC symbol may be received by the second sidelink UE and used to set an amplifier gain of a receiver (e.g., receiver of the transceiver 610) of the second sidelink UE. Setting the gain of the receiver of the second sidelink UE using the AGC symbol in the leading symbol of the S-SSB may enable the second sidelink UE to properly decode the PSS, SSS, and PBCH received in subsequent symbols. In some aspects, the content of the AGC symbol may match the content of a PBCH symbol of the S-SSB. In other words, the leading symbol of the S-SSB serving as an AGC symbol for the second sidelink UE may be the same as one of the PBCH symbols of the S-SSB. The AGC symbol may match any one of the PBCH symbols of the S-SSB. In some aspects, the AGC symbol may match the trailing (e.g., the last) PBCH symbol of the S-SSB. In this case, the leading symbol of the S-SSB and the trailing symbol of the S-SSB may match.

In some aspects, the first sidelink UE may perform one or more rate matching operations associated with the S-SSB. For example, the first sidelink UE may rate match the PBCH resources around the AGC symbol resources. In some aspects, the first sidelink UE may rate match the PBCH resources around the AGC symbol resources in order to satisfy an occupied channel bandwidth (OCB) threshold (e.g., an 80% OCB threshold).

In some aspects, the S-SSB may include five contiguous symbols. The leading symbol (e.g., the first symbol) may include the AGC symbol (e.g., with the contents of the AGC symbol matching the trailing PBCH symbol). The second symbol may include the PSS. The third symbol may include the PBCH. The fourth symbol may include the SSS and the PBCH. The SSS may occupy resource elements in the middle of the bandwidth part associated with the fourth symbol. The PBCH may occupy the rest of the resource elements not occupied by the SSS in the bandwidth part of the fourth symbol. The trailing symbol (e.g., the fifth symbol) may include the PBCH matching the content of the leading symbol.

The slot may include 14 symbols (e.g., symbol indexes 0 to 13). The slot may include three candidate S-SSB locations each occupying five contiguous symbols. A first candidate S-SSB location may include symbol indexes 0-4. A second candidate S-SSB location may include symbol indexes 4-8. A third candidate S-SSB location may include symbol indexes 8-12. Symbol index 13 may include a guard symbol. In some aspects, the trailing symbol of the first candidate S-SSB location may overlap the leading symbol of the second S-SSB candidate location. For example, trailing symbol index 4 of the first candidate S-SSB location may overlap the leading symbol index 4 of the second candidate S-SSB location. Trailing symbol index 4 of the first candidate S-SSB location and leading symbol index 4 of the second candidate S-SSB location may include the same PBCH content. Trailing symbol index 8 of the second candidate S-SSB location may overlap the leading symbol index 8 of the third candidate S-SSB location. Trailing symbol index 8 of the second candidate S-SSB location and leading symbol index 8 of the third candidate S-SSB location may include the same PBCH content. In some aspects, the second sidelink UE may receive an S-SSB from the first sidelink UE and another S-SSB from another sidelink UE (e.g., a syncref sidelink UE). For example, the second sidelink UE may receive an S-SSB from the first sidelink UE in the first candidate S-SSB location (e.g., symbols 0-4) and receive another S-SSB from another sidelink UE in the second candidate S-SSB location (e.g., symbols 4-8). Since the content of symbol 4 of the first candidate location is the same as the content of symbol 4 of the second candidate location, the second sidelink UE may set the gain of its receiver using the PBCH content of symbol 4.

In some aspects, the first sidelink UE may perform the LBT prior to transmitting the S-SSB in a candidate S-SSB location. Having multiple candidate S-SSB locations (e.g., 3 candidate S-SSB locations) in a slot may provide more opportunities for the first sidelink UE to perform a successful LBT and transmit the S-SSB as compared to having a single S-SSB candidate location in the slot. For example, the first sidelink UE may perform an LBT prior to (e.g., just prior to) symbol index 0 to gain the channel. If the LBT is successful, the first sidelink UE may transmit the S-SSB in the first candidate S-SSB location (e.g., symbol indexes 0-4). If the LBT prior to symbol index 0 fails, the first sidelink UE may have another opportunity to perform an LBT prior to symbol index 4. If the LBT prior to symbol index 4 is successful, the first sidelink UE may transmit the S-SSB in the second candidate S-SSB location (e.g., symbol indexes 4-8). If the LBT prior to symbol index 4 fails, the first sidelink UE may have another opportunity to perform an LBT prior to symbol index 8. If the LBT prior to symbol index 8 is successful, the first sidelink UE may transmit the S-SSB in the third candidate S-SSB location (e.g., symbol indexes 8-12).

Figure 9:
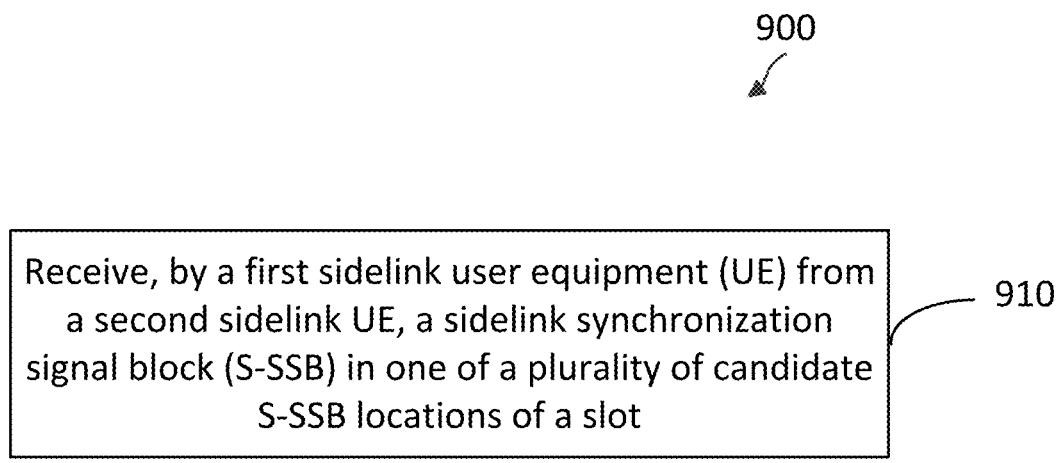
FIG. 9 is a flow diagram of a communication method according to some aspects of the present disclosure.

FIG. 9 is a flow diagram of a communication method 900 according to some aspects of the present disclosure. Aspects of the method 900 can be executed by a computing device (e.g., a processor, processing circuit, and/or other suitable component) of a wireless communication device or other suitable means for performing the aspects. For example, a wireless communication device, such as the UE 115, the UE 120, or the UE 600, may utilize one or more components, such as the processor 602, the memory 604, the S-SSB module 608, the transceiver 610, the modem 612, and the one or more antennas 616, to execute aspects of method 900. The method 900 may employ similar mechanisms as in the networks 100 and 200 and the aspects and actions described with respect to FIGS. 3-5. As illustrated, the method 900 includes a number of enumerated aspects, but the method 900 may include additional aspects before, after, and in between the enumerated aspects. In some aspects, one or more of the enumerated aspects may be omitted or performed in a different order.

At action 910, the method 900 includes the first sidelink UE receiving a sidelink synchronization signal block (S-SSB) from a second sidelink UE (e.g., the UE 115, the UE 120, or the UE 600) based on the second sidelink UE performing a successful LBT in order to gain access to the channel. The first sidelink UE may receive the S-SSB from the second sidelink UE in one of a plurality of candidate S-SSB locations of a slot. The S-SSB may allow the first sidelink UE and other sidelink UEs to discover the second sidelink UE and establish a sidelink connection with the second sidelink UE for subsequent sidelink communications. The S-SSB may include a primary synchronization signal (PSS), a secondary synchronization signal (SSS) and/or a physical broadcast channel (PBCH). The PSS may enable synchronization of slot timing and may indicate a physical layer identifier associated with the second sidelink UE. The SSS may enable radio frame synchronization. The SSS may also enable detection of a duplexing mode and a cyclic prefix length. In some aspects, the second sidelink UE may transmit S-SSBs using multiple beams in a beam-sweeping manner. In some aspects, the S-SSBs may be transmitted on respective directional beams, where one or more SSBs may be included within a burst.

In some aspects, the first sidelink UE may receive the S-SSB in one or more of multiple candidate locations of a slot (e.g., a 14 symbol OFDM slot). The slot may include one, two, three, four, or more candidate S-SSB locations in the slot. Each of the candidate S-SSB locations may include multiple contiguous symbols. For example, the first sidelink UE may receive the S-SSB in three, four, five, or more contiguous symbols. In some aspects, the S-SSB may include one symbol for automatic gain (AGC) control, one symbol for the PSS, one symbol for the SSS, and one or more symbols for the PBCH. In some aspects, the PBCH may occupy (e.g., share) the same bandwidth part with the SSS.

In some aspects, the AGC symbol may be located in a leading symbol of the S-SSB. The leading symbol of the S-SSB may be the first symbol of the S-SSB to be received by the first sidelink UE. The AGC symbol may be received by the first sidelink UE and used to set an amplifier gain of a receiver (e.g., receiver of the transceiver 610) of the first sidelink UE. Setting the gain of the receiver of the first sidelink UE using the AGC symbol in the leading symbol of the S-SSB may enable the first sidelink UE to properly decode the PSS, SSS, and PBCH received in subsequent symbols. In some aspects, the content of the AGC symbol may match the content of a PBCH symbol of the S-SSB. In other words, the leading symbol of the S-SSB serving as an AGC symbol for the first sidelink UE may be the same as one of the PBCH symbols of the S-SSB. The AGC symbol may match any one of the PBCH symbols of the S-SSB. In some aspects, the AGC symbol may match the trailing (e.g., the last) PBCH symbol of the S-SSB. In this case, the leading symbol of the S-SSB and the trailing symbol of the S-SSB may match.

In some aspects, the S-SSB may include five contiguous symbols. The leading symbol (e.g., the first symbol) may include the AGC symbol (e.g., with the contents of the AGC symbol matching the trailing PBCH symbol). The second symbol may include the PSS. The third symbol may include the PBCH. The fourth symbol may include the SSS and the PBCH. The SSS may occupy resource elements in the middle of the bandwidth part associated with the fourth symbol. The PBCH may occupy the rest of the resource elements not occupied by the SSS in the bandwidth part of the fourth symbol. The trailing symbol (e.g., the fifth symbol) may include the PBCH matching the content of the leading symbol.

The slot may include 14 symbols (e.g., symbol indexes 0 to 13). The slot may include three candidate S-SSB locations each occupying five contiguous symbols. A first candidate S-SSB location may include symbol indexes 0-4. A second candidate S-SSB location may include symbol indexes 4-8. A third candidate S-SSB location may include symbol indexes 8-12. Symbol index 13 may include a guard symbol. In some aspects, the trailing symbol of the first candidate S-SSB location may overlap the leading symbol of the second S-SSB candidate location. For example, trailing symbol index 4 of the first candidate S-SSB location may overlap the leading symbol index 4 of the second candidate S-SSB location. Trailing symbol index 4 of the first candidate S-SSB location and leading symbol index 4 of the second candidate S-SSB location may include the same PBCH content. Trailing symbol index 8 of the second candidate S-SSB location may overlap the leading symbol index 8 of the third candidate S-SSB location. Trailing symbol index 8 of the second candidate S-SSB location and leading symbol index 8 of the third candidate S-SSB location may include the same PBCH content. In some aspects, the first sidelink UE may receive an S-SSB from the second sidelink UE and another S-SSB from another sidelink UE (e.g., a syncref sidelink UE). For example, the first sidelink UE may receive an S-SSB from the second sidelink UE in the first candidate S-SSB location (e.g., symbols 0-4) and receive another S-SSB from another sidelink UE in the second candidate S-SSB location (e.g., symbols 4-8). Since the content of symbol 4 of the first candidate location is the same as the content of symbol 4 of the second candidate location, the first sidelink UE may set the gain of its receiver using the PBCH content of symbol 4.

In some aspects, the second sidelink UE may perform an LBT prior to transmitting the S-SSB in a candidate S-SSB location. Having multiple candidate S-SSB locations (e.g., 3 candidate S-SSB locations) in a slot may provide more opportunities for the second sidelink UE to perform a successful LBT and transmit the S-SSB as compared to having a single S-SSB candidate location in the slot. For example, the second sidelink UE may perform an LBT prior to (e.g., just prior to) symbol index 0 to gain the channel. If the LBT is successful, the second sidelink UE may transmit the S-SSB in the first candidate S-SSB location (e.g., symbol indexes 0-4). If the LBT prior to symbol index 0 fails, the second sidelink UE may have another opportunity to perform an LBT prior to symbol index 4. If the LBT prior to symbol index 4 is successful, the second sidelink UE may transmit the S-SSB in the second candidate S-SSB location (e.g., symbol indexes 4-8). If the LBT prior to symbol index 4 fails, the second sidelink UE may have another opportunity to perform an LBT prior to symbol index 8. If the LBT prior to symbol index 8 is successful, the second sidelink UE may transmit the S-SSB in the third candidate S-SSB location (e.g., symbol indexes 8-12).

Further aspects of the present disclosure include the following:

Aspect 1 includes a method of wireless communication performed by a first sidelink user equipment (UE), the method comprising performing a listen-before-talk (LBT) procedure; and transmitting, to a second sidelink UE based on the LBT procedure being successful, a sidelink synchronization signal block (S-SSB) in one of a plurality of candidate S-SSB locations of a slot.

Aspect 2 includes the method of aspect 1, wherein a leading symbol of the S-SSB comprises an automatic gain control (AGC) symbol.

Aspect 3 includes the method of any of aspects 1-2, further comprising rate matching the AGC symbol with a physical broadcast channel (PBCH) symbol of the S-SSB.

Aspect 4 includes the method of any of aspects 1-3, wherein content of the AGC symbol matches content of a physical broadcast channel (PBCH) symbol of the S-SSB.

Aspect 5 includes the method of any of aspects 1-4, wherein the content of the AGC symbol matches the content of a trailing PBCH symbol of the S-SSB.

Aspect 6 includes the method of any of aspects 1-5, wherein the slot comprises three candidate S-SSB locations.

Aspect 7 includes the method of any of aspects 1-6, wherein a trailing symbol of a first candidate S-SSB location overlaps a leading symbol of a second S-SSB candidate location.

Aspect 8 includes the method of any of aspects 1-7, wherein a trailing symbol of the second candidate S-SSB location overlaps a leading symbol of a third S-SSB candidate location.

Aspect 9 includes the method of any of aspects 1-8, wherein each of the candidate S-SSB locations comprises five symbols.

Aspect 10 includes a method of wireless communication performed by a first sidelink user equipment (UE), the method comprising receiving, from a second sidelink UE, a sidelink synchronization signal block (S-SSB) in one of a plurality of candidate S-SSB locations of a slot.

Aspect 11 includes the method of aspect 10, wherein a leading symbol of the S-SSB comprises an automatic gain control (AGC) symbol.

Aspect 12 includes the method of any of aspects 10-11, wherein the AGC symbol is rate matched with a physical broadcast channel (PBCH) symbol of the S-SSB.

Aspect 13 includes the method of any of aspects 10-12, wherein content of the AGC symbol matches content of a physical broadcast channel (PBCH) symbol of the S-SSB.

Aspect 14 includes the method of any of aspects 10-13, wherein the content of the AGC symbol matches the content of a trailing PBCH symbol of the S-SSB.

Aspect 15 includes the method of any of aspects 10-14, wherein the slot comprises three candidate S-SSB locations.

Aspect 16 includes the method of any of aspects 10-15, wherein a trailing symbol of the second candidate S-SSB location overlaps a leading symbol of a third S-SSB candidate location.

Aspect 17 includes the method of any of aspects 10-16, wherein a trailing symbol of a first candidate S-SSB location overlaps a leading symbol of a second S-SSB candidate location.

Aspect 18 includes the method of any of aspects 10-17, wherein each of the candidate S-SSB locations comprises five symbols.

Aspect 19 includes a first sidelink user equipment (UE) comprising a memory; a transceiver; and at least one processor coupled to the memory and the transceiver, wherein the first sidelink UE is configured to perform any one of aspects 1-9.

Aspect 20 includes a first sidelink user equipment (UE) comprising a memory; a transceiver; and at least one processor coupled to the memory and the transceiver, wherein the first sidelink UE is configured to perform any one of aspects 10-18.

Aspect 21 includes a non-transitory computer-readable medium storing one or more instructions for wireless communication, the one or more instructions comprising one or more instructions that, when executed by one or more processors of a first sidelink UE, cause the first sidelink UE to perform any one of aspects 1-9.

Aspect 22 includes a non-transitory computer-readable medium storing one or more instructions for wireless communication, the one or more instructions comprising one or more instructions that, when executed by one or more processors of a first sidelink UE, cause the first sidelink UE to perform any one of aspects 10-18.

Aspect 23 includes a first sidelink user equipment (UE) comprising one or more means to perform any one or more of aspects 1-9.

Aspect 24 includes a first sidelink user equipment (UE) comprising one or more means to perform any one or more of aspects 10-18.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular instances illustrated and described herein, as they are merely by way of some examples thereof, but rather, should be fully commensurate with that of the claims appended hereafter and their functional equivalents.

What is claimed is:

1. A method of wireless communication performed by a first sidelink user equipment (UE), the method comprising:
performing a listen-before-talk (LBT) procedure; anel
transmitting, to a second sidelink UE based on the LBT procedure being successful, a sidelink synchronization signal block (S-SSB) in one of a plurality of candidate S-SSB locations of a slot, wherein a leading symbol of the S-SSB comprises an automatic gain control (AGC) symbol; and
rate matching the AGC symbol with a physical broadcast channel (PBCH) symbol of the S-SSB.

2. The method of claim 1, wherein content of the AGC symbol matches content of the physical broadcast channel (PBCH) symbol of the S-SSB.

3. The method of claim 2, wherein the content of the AGC symbol matches the content of a trailing PBCH symbol of the S-SSB.

4. The method of claim 1, wherein the slot comprises three candidate S-SSB locations.

5. The method of claim 1, wherein a trailing symbol of a first candidate S-SSB location overlaps a leading symbol of a second S-SSB candidate location.

6. The method of claim 5, wherein a trailing symbol of the second candidate S-SSB location overlaps a leading symbol of a third S-SSB candidate location.

7. The method of claim 1, wherein each of the candidate S-SSB locations comprises five symbols.

8. A method of wireless communication performed by a first sidelink user equipment (UE), the method comprising:
receiving, from a second sidelink UE, a sidelink synchronization signal block (S-SSB) in one of a plurality of candidate S-SSB locations of a slot, wherein a leading symbol of the S-SSB comprises an automatic gain control (AGC) symbol; and
wherein the AGC symbol is rate matched with a physical broadcast channel (PBCH) symbol of the S-SSB.

9. A first sidelink user equipment (UE) comprising:
a memory;
a transceiver; and
at least one processor coupled to the memory and the transceiver, wherein the first sidelink UE is configured to:
perform a listen-before-talk (LBT) procedure; and
transmit, to a second sidelink UE based on the LBT procedure being successful, a sidelink synchronization signal block (S-SSB) in one of a plurality of candidate S-SSB locations of a slot, wherein a leading symbol of the S-SSB comprises an automatic gain control (AGC) symbol; and
rate match the AGC symbol with a physical broadcast channel (PBCH) symbol of the S-SSB.

10. The first sidelink UE of claim 9, wherein content of the AGC symbol matches content of the physical broadcast channel (PBCH) symbol of the S-SSB.

11. The first sidelink UE of claim 10, wherein the content of the AGC symbol matches the content of a trailing PBCH symbol of the S-SSB.

12. The first sidelink UE of claim 9, wherein the slot comprises three candidate S-SSB locations.

13. The first sidelink UE of claim 9, wherein a trailing symbol of a first candidate S-SSB location overlaps a leading symbol of a second S-SSB candidate location.

14. The first sidelink UE of claim 13, wherein a trailing symbol of the second candidate S-SSB location overlaps a leading symbol of a third S-SSB candidate location.

15. The first sidelink UE of claim 9, wherein each of the candidate S-SSB locations comprises five symbols.

16. A first sidelink user equipment (UE) comprising:
a memory;
a transceiver; and
at least one processor coupled to the memory and the transceiver, wherein the first sidelink UE is configured to:
receive, from a second sidelink UE, a sidelink synchronization signal block (S-SSB) in one of a plurality of candidate S-SSB locations of a slot, wherein a leading symbol of the S-SSB comprises an automatic gain control (AGC) symbol; and
wherein the AGC symbol is rate matched with a physical broadcast channel (PBCH) symbol of the S-SSB.

17. The first sidelink UE of claim 16, wherein content of the AGC symbol matches content of the physical broadcast channel (PBCH) symbol of the S-SSB.

18. The first sidelink UE of claim 17, wherein the content of the AGC symbol matches the content of a trailing PBCH symbol of the S-SSB.

19. The first sidelink UE of claim 16, wherein the slot comprises three candidate S-SSB locations.

20. The first sidelink UE of claim 16, wherein a trailing symbol of a first candidate S-SSB location overlaps a leading symbol of a second S-SSB candidate location.

21. The first sidelink UE of claim 20, wherein a trailing symbol of the second candidate S-SSB location overlaps a leading symbol of a third S-SSB candidate location.

22. The first sidelink UE of claim 20, wherein each of the candidate S-SSB locations comprises five symbols.

\* \* \* \* \*